Jan. 22, 1963  J. S. WHEELER, JR  3,074,427
PIVOTED VALVE
Filed June 2, 1958
2 Sheets-Sheet 1
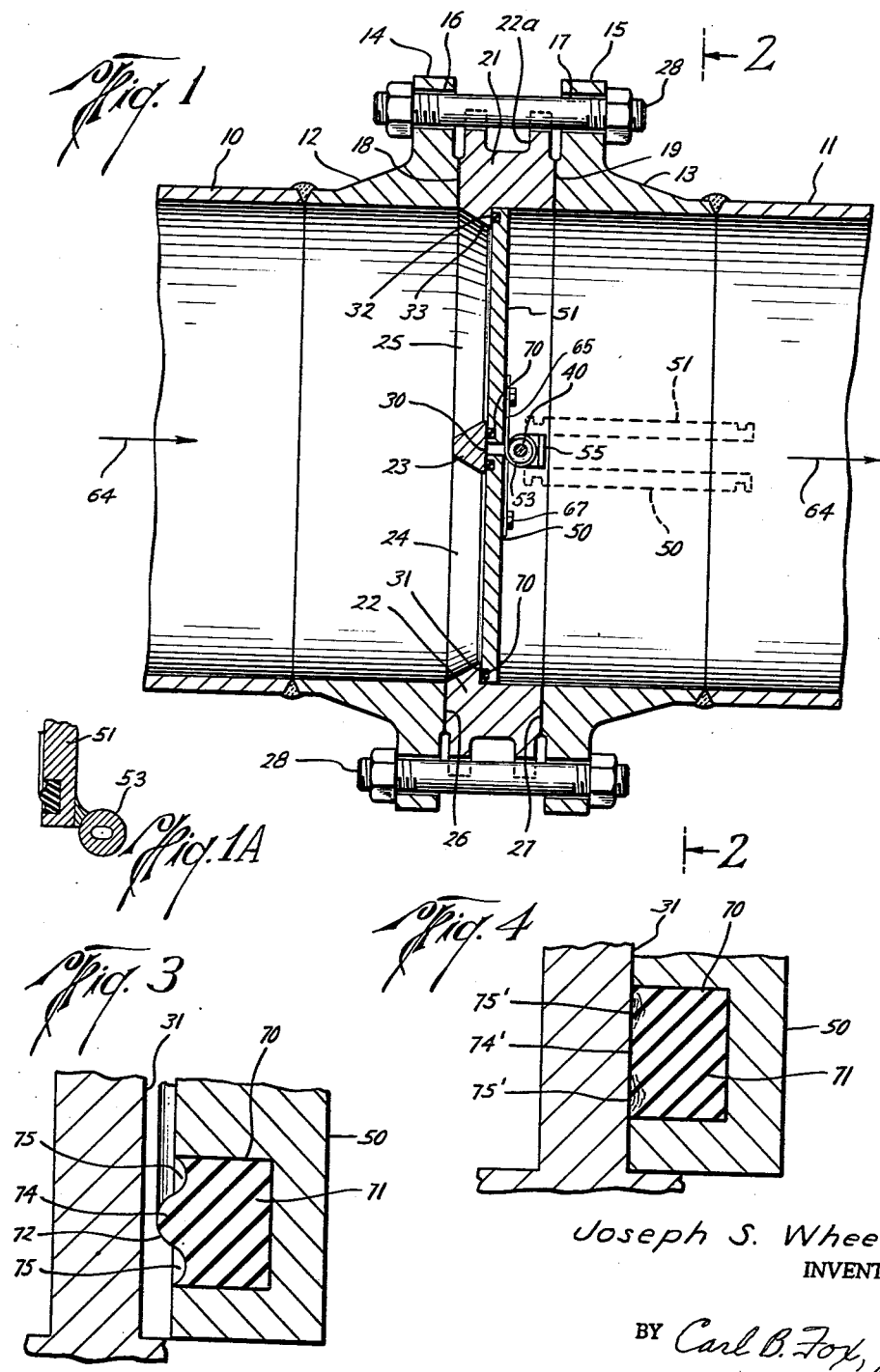
Joseph S. Wheeler, Jr.
INVENTOR.
BY Carl B. Fox, Jr.
ATTORNEY Jan. 22, 1963  J. S. WHEELER, JR  3,074,427
PIVOTED VALVE
Filed June 2, 1958
2 Sheets-Sheet 2
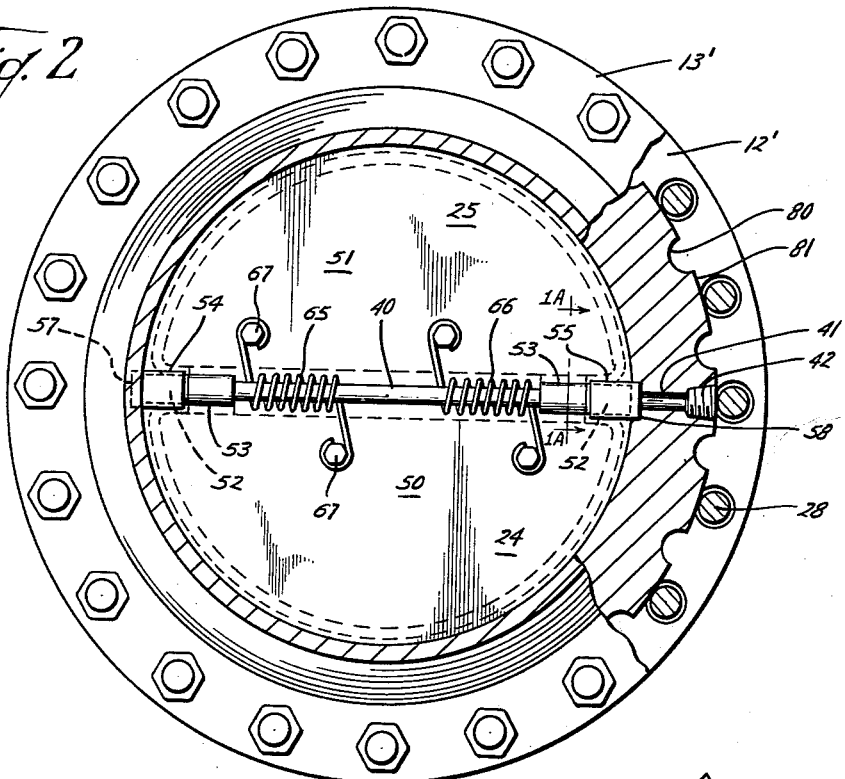
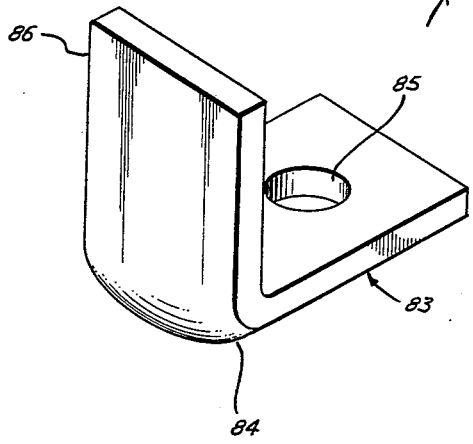
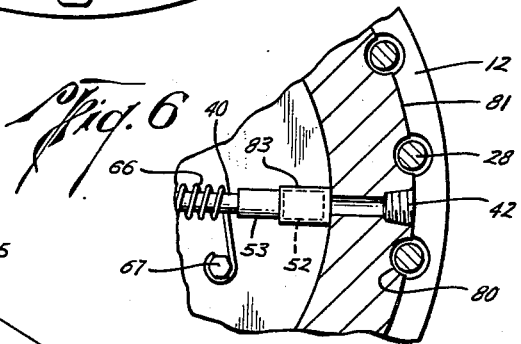
Joseph S. Wheeler, Jr.
INVENTOR.
BY Carl B. Fox, Jr.
ATTORNEY United States Patent Office 3,074,427
Patented Jan. 22, 1963

3,074,427
PIVOTED VALVE
Joseph S. Wheeler, Jr., Houston, Tex., assignor to Mission Valve and Pump Company, a corporation of Texas
Filed June 2, 1958, Ser. No. 739,250
2 Claims. (Cl. 137—512.1)

This invention pertains to valves and more particularly to improved check valves for fluid transmission pipelines.

With increasing diameters and pressures of pipelines there has been an attendant increase in cost and weight of check valves used therein. There also results an increase in the expense of handling, installing and servicing such large valves.

It is the principal object of the invention to provide an inexpensive, lightweight check valve of improved design and performance, which can be easily and inexpensively handled, installed, and serviced.

According to the invention a valve body is provided having the general shape of a coupling flange which can be clamped between the coupling flanges on the adjacent ends of the pipeline. The valve closure means takes the form of two half discs disposed with their straight sides adjacent and loosely pivotally mounted on a shaft extending diametrically across the valve body into sockets on the inside of the valve body. The valve seats comprise an annular shoulder etxending around the inner periphery of the valve body and the coplanar surface of a diametral rib formed or cast integral with the valve body and extending across the valve body in azimuthal alignment with the shaft.

By virtue of the free floating or loosely pivoted mounting of the valve closure members there is assured a seal with the valve seats. The diametral rib provides not only seats which seal with the straight sides of the closure members but also an additional support for the closure members. As a result the closure members need not be nearly as thick in order to resist any given pressure. The specific shape and mounting of the closure members allows them to open like a hinge and fold back substantially against each other leaving a clear flow passage without the necessity for providing any additional body cavity space of much larger interal diameter than the pipeline with which the valve is connected. The valve seat is between the ends or opposite faces of the body and spaced sufficiently from the downstream end or face of the body so that when the valve is closed the entire unit can be withdrawn from the pipeline without removing the adjacent sections of pipe from the line.

This application is a continuation-in-part of my prior copending application for United States Letters Patent, S.N. 689,304, filed October 10, 1957, now Patent Number 3,026,901 entitled "Valve."

Other objects and advantages of the invention will appear from the following description of preferred embodiments thereof wherein:

FIGURE 1 is an axial section through a portion of a pipeline including a valve embodying the invention;

FIGURE 1A is a fragmentary section through one of the valve closures taken on line 1A—1A of FIGURE 2;

FIGURE 2 is a transverse section through a portion of another pipeline having the same inner diameter as the pipeline of FIGURE 1 but with coupling flanges having a larger diameter bolt circle, and having the valve of FIGURE 1 installed therein;

FIGURE 3 is an enlarged section showing the valve seal means in unseated condition;

FIGURE 4 is similar to FIGURE 3 except showing the seal in seated condition;

FIGURE 5 is a perspective view showing a modified valve closure angle stop; and, FIGURE 6 is a transverse section through a pipe line similar to that of FIGURE 1 showing a modified form of valve therein incorporating the FIGURE 5 angle stop.

Referring now to the drawings, there is shown a portion of a pipeline including pipes 10, 11 to which couplings 12, 13 are welded. The couplings have the same inner diameter as the pipes. The couplings are provided with flanges 14, 15 each having a plurality of azimuthally spaced apart bolt holes 16, 17 therethrough. The flange ends of the couplings are provided with sealing surfaces 18, 19, the outer portions of the ends of the couplings being relieved below the seating surfaces where the bolt holes are located.

Between the flanges of the couplings is disposed valve body 21. The valve body has the shape of a divided ring, that is, a circular ring having a diametral rib thereacross, and includes the circular or ring shaped portion 22 and diametral rib 23 dividing the space inside the ring into two separate passages 24, 25, each of semi-circular cross-section. The end faces 26, 27 of the ring portion of the valve body provide seating surfaces to engage and seal with seating surfaces 18, 19 of the coupling flanges when bolts 28 are tightened.

As is best shown in FIGURE 1, ring shaped portion 22 of valve body 21 has a circular recess 22a therearound, whereby the outer periphery of the ring comprises two circular flange-like structures one to either side of recess 22a. Recess 22a contributes to the lightness in weight of the valve, which lightness in weight is achieved in the main by the fact that the valve body 21 is axially thin, between faces 26, 27, and is diametrically small, no portion of the valve body extending radially beyond the bolts 28.

The rib 23 has a plane surface 30 disposed between the end faces of the valve ring. The adjacent parallel longitudinal sides of surface 30 provide straight valve seating surfaces which merge with semi-circular seating surfaces 31, 32 formed on annular shoulder 33 on the inner periphery of the valve ring. There is thus provided a continuous valve seat around each of the passages 24, 25.

A shaft 40, best shown in FIGURE 2, extends diametrically across the valve ring parallel to rib 23 and spaced therefrom. The ends of the shaft are received in holes such as 41 in the valve ring. The outer ends of the holes are counterbored and taper threaded to receive screw plugs 42 to close and seal same.

A pair of semi-circular disc shaped valve closures 50, 51, are each provided with a pair of bearings 52, 53 disposed on shaft 40. The bearings are of larger inner diameter than the outer diameter of the shaft so as to make a loose fit. By this means the closures are pivotally mounted for floating movement between a closed position in which they lie against the valve seats around passages 24, 25 as shown in full lines in FIGURE 1 and open positions at angles thereto as shown in dashed lines.

As best shown in FIGURE 1, the bearings 52, 53 of each closure are out of line with the plane of the closure so that when the valve is open so that the closures are perpendicular to the seats around passages 24, 25 there is a space equal to the bearing diameters between the backs of the closures. An angle stop 54, 55 is disposed in the space between the backs of the closures near each end of the shaft 40.

Each angle stop 54, 55 is in the form of a rectangular bar bent into the shape of an L. The horizontal portion of each stop has a perforation to receive shaft 40 therethrough. Ring 22 has, at its radial inner surfaces about the inner ends of the holes 41, a pair of opposite recesses 57, 58, each of the recesses being rectangular and of dimensions to receive the horizontal portion of one of the angle stops. The horizontal portions of the stops are held in place in the recesses by shaft 40 disposed therethrough and by the adjacent bearings 52, 52 of the closures. The vertical portions of the angle stops are disposed parallel to shaft 40, but spaced therefrom, as shown in FIGURE 1, and extend to between the positions of the closures 50, 51 as represented by dashed lines in FIGURE 1. Stops 54, 55 serve as means for preventing closures 50, 51 from moving beyond their positions perpendicular to the seats around passages 24, 25, so that fluids in pipe 11 may enter between the back-to-back closures when the valve is open and cause closing of the valve should the biasing means, not yet described, of the closure means become inoperative.

Normal flow direction is indicated in FIGURE 1 by arrows 64. Reversal of flow will cause fluids to enter between the back-to-back closures and force them closed. However it is preferred to bias the closures to closed position by means of a pair of helical torsion springs 65, 66 disposed around shaft 40 and secured at their opposite ends to the closures by screws 67. The spring coils have a larger inner diameter than the outer diameter of the shaft 40 so as to maintain the floating relationship between the shaft and the closures. This insures proper seating of the closures on their seats by allowing them to move until coplanar with the seats.

Around the edge of each valve closure where the closure engages its seat surface around passage 24 or 25 there is a channel such as 70 (see FIGURES 3, 4, particularly), the channel having a square or rectangular cross section. The channels are substantially filled with a synthetic rubber packing material 71 having a shaped contour across the mouths of the channels such as at 72. The shaped contour of the packing material includes a convex curved rib 74 along the center of the channel and a concave curved trough 75 along the sides of the channel at each side of rib 74. The curves of rib 74 and troughs 75 to either side thereof are smoothly merged to make contoured surface 72.

In FIGURE 3 packing material 71 is shown in the relaxed or non-sealing condition, the seat 31, for example, being spaced from closure 50 and the rib 74 being spaced from seat 31. In FIGURE 4, the packing material 71 is shown with its contoured surface compressed, closure 50 being against seat 31, shown by way of example, to force rib 74 into the body of packing material 71, the compression of the packing material causing flow of packing material to totally or substantially eliminate the two troughs 75. Rib 74 and troughs 75 are designated by reference numerals 74' and 75', 75' in FIGURE 4 to indicate their flattened compressed forms. The spaces within the channels 70 provided by troughs 75 provide space for the material of rib 74 to flow into when compressed, the closure 50 (or 51) seating substantially flushly upon the seat surface around passage 24 (or 25) when the valve is closed.

As shown in FIGURE 1, when the valve is closed all portions of the valve lie within a volume bounded by the periphery and end faces 26, 27 of the valve body ring 21 so that the valve can be installed and removed by sliding it laterally between the couplings 12, 13 when sufficient of the bolts have been removed. The body is held in register with the couplings by the bolts when the valve is in use.

In order that the valve may be used interchangeably with a plurality of types of pipes 10, 11 and/or couplings 12, 13 the outer peripheral flanges of ring 21 are provided with a plurality of semicircular recesses 80 spaced therearound. The recesses 80 are spaced according to the spacing of bolts 28. Between adjacent of the recesses 80 there are the non-recessed peripheral surfaces 81. Now, comparing FIGURES 1 and 6 with FIGURE 2, the bolts 28 are shown disposed within the recesses 80 in FIGURES 1 and 6 and upon the surfaces 81 in FIGURE 2. Since the couplings of FIGURE 2 differ from the couplings 12, 13 of FIGURES 1 and 6, the couplings in FIGURE 2 corresponding to couplings 12, 13 of FIGURES 1 and 6 are designated by reference numerals 12', 13', respectively.

Couplings 12, 13 and 12', 13' differ in that the diameters of the bolt circles of bolts 28 differ. There may be other differences between the couplings and flanges, e.g. difference in outer diameter. For example, flanges 12, 13 may be "150 Series" flanges (sometimes designated "15 Series") while the flanges 12', 13' may be "300 Series" flanges (sometimes designated "30 Series"). At any rate, the same valve may be installed between flanges of different types having differing bolt circles, in one case the bolts being disposed within the outer flange recesses and in the other case the bolts being disposed against the flange peripheries between the recesses.

It would also be possible to provide packing rings or gaskets between the end faces of the couplings and the ends of the valve body ring but this would complicate assembly and disassembly so that the plain metal to metal contact shown is preferred.

It will be noted from FIGURE 1 that the valve closures have a slightly smaller radius than the pipeline and couplings. This is to insure clearance in case the valve body ring is not in perfect registry with the couplings, as is possible due to the usual clearances provided in the coupling bolt holes. The shoulder 33 projects far enough inwardly to provide sufficient overlap between closures and seats. The shoulder 33 is of triangular cross-section which, together with the triangular section of rib 23, provide a streamlined wall for flow passages 24, 25 with respect to the normal direction of flow.

Referring now to FIGURES 5 and 6, there is shown a modified form for the angle stops 54, 55 which appear in FIGURES 1 and 2. In FIGURE 6 the recesses 57, 58 of the FIGURE 2 embodiment are absent. The angle stops, only one, angle stop 83, being shown, each have the same general L shape as angle stops 54, 55. However, the outer face 84 of the perforate part of the L is convexly curved to fit flush against the inner side of ring 21, being shown in that position in FIGURE 6. The circular perforation 85 freely receives the shaft 40. The outer angular part 86 of the stop is rectangular similarly as the corresponding parts of stops 54, 55. The curved surface 84, being held against the corresponding curved ring interior by a bearing 52, is held against turning and the stop 83 has a function identical with that of stops 54, 55.

While preferred embodiments of the invention have been shown and described, many modifications thereof may be made by a person skilled in the art without departing from the spirit of the invention, and it is intended to protect by Letters Patent all forms of the invention falling within the scope of the following claims.

I claim:

1. A check valve comprising a body, said body including a ring portion having a seating face on each end thereof (adapted to be clamped between adjacent bolted together coupling flanges of a pipe line) and including a rib extending diametrically thereacross dividing the opening through the ring into two passages, a valve seat formed on said ring portion and web around each of said two passages and between said seating faces, a pair of semicircular valve closures each for seating on one of said seats to close one of said passages, each said closure having a straight side pivotally supported adjacent said rib whereby said closures may be pivotally moved away from said seats to open said passages, said valve closures being of no greater thickness than the spacing of said valve seats from the one of said seating faces of the valve ring that faces in the same direction whereby when said closures are on their seats and said flanges are unbolted the valve body can be inserted between the flanges without separation of the flanges, said ring portion having a plurality of spaced recesses around its outer periphery adapted for coaction with joining bolts, and providing a plurality of peripheral surfaces between said recesses adapted for coaction with joining bolts whereby said body may be clamped between coupling flanges with the joining bolts on a circle corresponding to said recesses and may be clamped between coupling flanges having the joining bolts on a circle corresponding to said peripheral recesses.

2. A check valve comprising a body, said body including a ring portion having a seating face on each end thereof adapted to be clamped between adjacent bolted together coupling flanges of a pipeline and including a rib extending diametrically thereacross dividing the opening through the ring into two passages, a valve seat formed on said ring portion and rib around each of said two passages and between said seating faces, a pair of semi-circular valve closures each for seating on one of said seats to close one of said passages, each said closure having a straight diametric side, pivot means along each said side supporting each said side adjacent said rib whereby said closures may be pivotally moved away from said seats to open said passages, stop means disposed between said closures in said moved positions thereof to prevent said movement of said closures past positions more than 90° removed from the said seated positions of said closures, said ring portion of said body having a plurality of spaced recesses around its outer periphery adapted for coaction with joining bolts, and providing a plurality of peripheral surfaces between said recesses adapted for coaction with joining bolts, whereby said body may be clamped between coupling flanges having the joining bolts on a circle corresponding to said recesses or having the joining bolts on a circle corresponding to said peripheral surfaces.

References Cited in the file of this patent

UNITED STATES PATENTS

| | | |
|---|---|---|
| 235,384 | Russell | Dec. 14, 1880 |
| 1,199,769 | Dunbar | Oct. 3, 1916 |
| 1,238,878 | Bravo | Sept. 4, 1917 |
| 1,438,161 | Zimmerman | Dec. 5, 1922 |
| 2,265,596 | Carlson | Dec. 9, 1941 |
| 2,282,532 | Shenk | May 12, 1942 |
| 2,358,101 | Randall | Sept. 12, 1944 |
| 2,482,198 | Melichar | Sept. 20, 1949 |
| 2,556,904 | Cline et al. | June 12, 1951 |
| 2,678,187 | Peters | May 11, 1954 |
| 2,717,793 | Nenzell | Sept. 13, 1955 |
| 2,729,238 | Hite | Jan. 3, 1956 |
| 2,756,017 | Silverman | July 24, 1956 |
| 2,905,358 | Herbage | Sept. 22, 1959 |

FOREIGN PATENTS

| | | |
|---|---|---|
| 295,710 | Switzerland | Mar. 16, 1954 |
| 781,036 | France | Feb. 18, 1935 |